(12) United States Patent
Hensley

(10) Patent No.: US 12,217,049 B2
(45) Date of Patent: *Feb. 4, 2025

(54) DOCKER IMAGE REGISTRY SYNCHRONIZATION SERVICE

(71) Applicant: Confluent, Inc., Mountain View, CA (US)

(72) Inventor: Greg Hensley, Seattle, WA (US)

(73) Assignee: Confluent, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,606

(22) Filed: Oct. 19, 2023

(65) Prior Publication Data

US 2024/0069911 A1    Feb. 29, 2024

Related U.S. Application Data

(63) Continuation of application No. 17/900,477, filed on Aug. 31, 2022, now Pat. No. 11,836,484.

(51) Int. Cl.
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
CPC ..... G06F 8/61; G06F 8/63; G06F 8/65; G06F 8/71
See application file for complete search history.

(56) References Cited

U.S. PATENT DOCUMENTS

| | | |
|---|---|---|
| 2006/0130037 A1 | 6/2006 | Mackay |
| 2016/0140141 A1 | 5/2016 | Darcy |
| 2019/0347121 A1 | 11/2019 | Luo et al. |
| 2021/0255846 A1 | 8/2021 | Mamgain et al. |

FOREIGN PATENT DOCUMENTS

| | | |
|---|---|---|
| WO | 2021232845 | 11/2021 |
| WO | 2024050315 | 3/2024 |

OTHER PUBLICATIONS

U.S. Appl. No. 17/900,477, filed Aug. 31, 2022, Docker Image Registry Synchronization Service.

(Continued)

*Primary Examiner* — Duy T Nguyen

(74) *Attorney, Agent, or Firm* — Schwegman Lundberg & Woessner, P.A.

(57) ABSTRACT

A method of synchronizing container image lists is provided. A first container image list having first container images is accessed from a remote source. The first container images listed in the first container image list include a first tag and a first digest. A second container image list having second container images is accessed from a cloud-computing system registry. The second container images listed in the second container image list include a second tag and a second digest. Container images in the accessed container image lists are compared with each other. The comparison includes comparing the first tag with the second tag and, based on the tag comparison, the first digest with the second digest. The first container image list is synchronized with the second container image list based on the comparison of the container images.

14 Claims, 6 Drawing Sheets

(56) References Cited

OTHER PUBLICATIONS

"U.S. Appl. No. 17/900,477, Examiner Interview Summary mailed Jun. 2, 2023", 2 pgs.
"U.S. Appl. No. 17/900,477, Final Office Action mailed Apr. 7, 2023", 26 pgs.
"U.S. Appl. No. 17/900,477, Non Final Office Action mailed Dec. 28, 2022".
"U.S. Appl. No. 17/900,477, Notice of Allowance mailed Jul. 27, 2023", 10 pgs.
"U.S. Appl. No. 17/900,477, Response filed Mar. 27, 2023 to Non Final Office Action mailed Dec. 28, 2022", 14 pgs.
"U.S. Appl. No. 17/900,477, Response filed Jun. 6, 2023 to Final Office Action mailed Apr. 7, 2023", 12 pgs.
"International Application Serial No. PCT US2023 073013, International Search Report mailed Dec. 12, 2023", 5 pgs.
"International Application Serial No. PCT US2023 073013, Written Opinion mailed Dec. 12, 2023", 4 pgs.
Marc, Brandner, "Transporting Container Images With Skopeo", [Online] Retrieved from the internet:https: marcbrandner.com blog transporting-container-images-with-skopeo , (Apr. 11, 2021), 17 pgs.
Mjay, Savanth, "Docker Images: Name Vs. Tag Vs. Digest", [Online] Retrieved from the internet:https: hackernoon.com docker-images-name-vs-tag-vs-digest, (Sep. 26, 2021), 4 pgs.

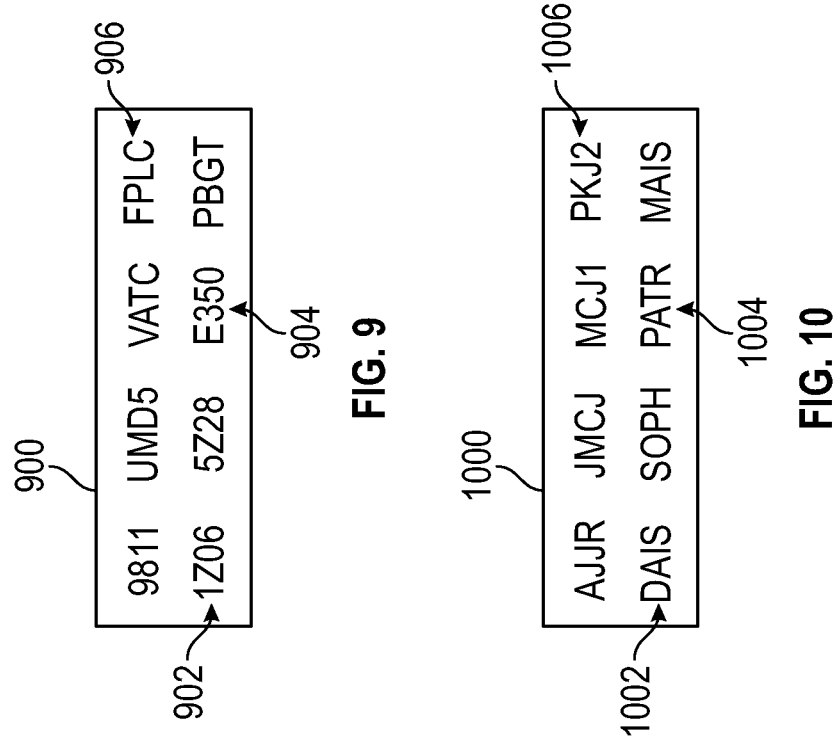
FIG. 9
FIG. 10
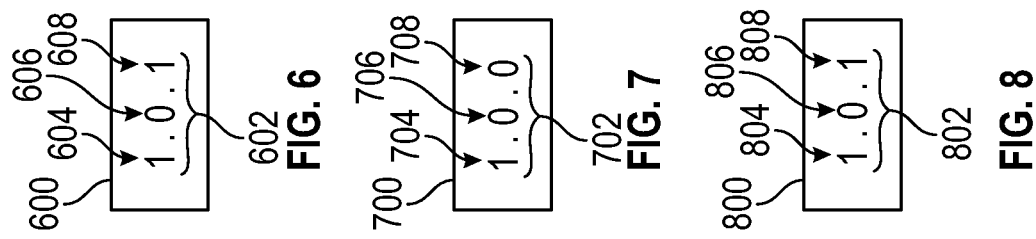
FIG. 6
FIG. 7
FIG. 8

DOCKER IMAGE REGISTRY SYNCHRONIZATION SERVICE

CROSS-REFERENCE TO RELATED APPLICATION

This application is a continuation of U.S. patent application Ser. No. 17/900,477, filed Aug. 31, 2022, which is incorporated by reference herein in its entirety.

TECHNICAL FIELD

Examples relate generally to distributed computing environments and, more particularly, but not by way of limitation, to synchronizing data between different registeries in distributed computing environments.

BACKGROUND

Cloud-computing systems, such as Amazon Web Services™ (AWS™) Microsoft Azure™, and Google Cloud Platform™, have grown in popularity as a method of providing computer implemented resources. These cloud-computing systems can provide services to various end-users based on the needs of the various end-users. Cloud-computing systems receive from a provider a container image of a program captured in a state that can be executed to provide a service. The container image includes files that are used to create an instance of an application on an end-user device implemented by the various end-users.

Typically, cloud-computing systems download the container image from a provider in order to locally run the executable image. The provider downloads the copy of the container image from a remote source. For each instance that runs the container image, the provider downloads a copy of the container image from the remote source and uploads the copy of the container image to the cloud-computing systems. On occasions where the cloud-computing systems run multiple instances of the container image, the provider accesses the remote source multiple times for each instance of the multiple instances and downloads the container image multiple times to the cloud-computing systems. However, accessing the remote source multiple times increases costs, such as resource utilization, and increases the time associated with allowing the various end-users to execute the instances that will run the container image.

Moreover, after cloud-computing systems have received the container image from the remote source, occasions can occur where an update is made to the container image and pushed to the remote source. Nonetheless, the cloud-computing systems may not have the updated container image. Therefore, the cloud-computing systems may allow for running of the wrong version of the container image. In addition, when a provider learns that an updated version exists, the provider has to repeat the process of accessing the remote source, downloading, and then uploading the container image, again incurring the problems noted above.

BRIEF DESCRIPTION OF THE DRAWINGS

Various ones of the appended drawings merely illustrate examples of the present disclosure and should not be considered as limiting its scope.

FIGS. 6-8 show tags that can accompany container images, according to some examples.

FIGS. 9 and 10 illustrate digests that can accompany the tags of FIGS. 6 and 7, according to some examples.

DETAILED DESCRIPTION

Figure 1:
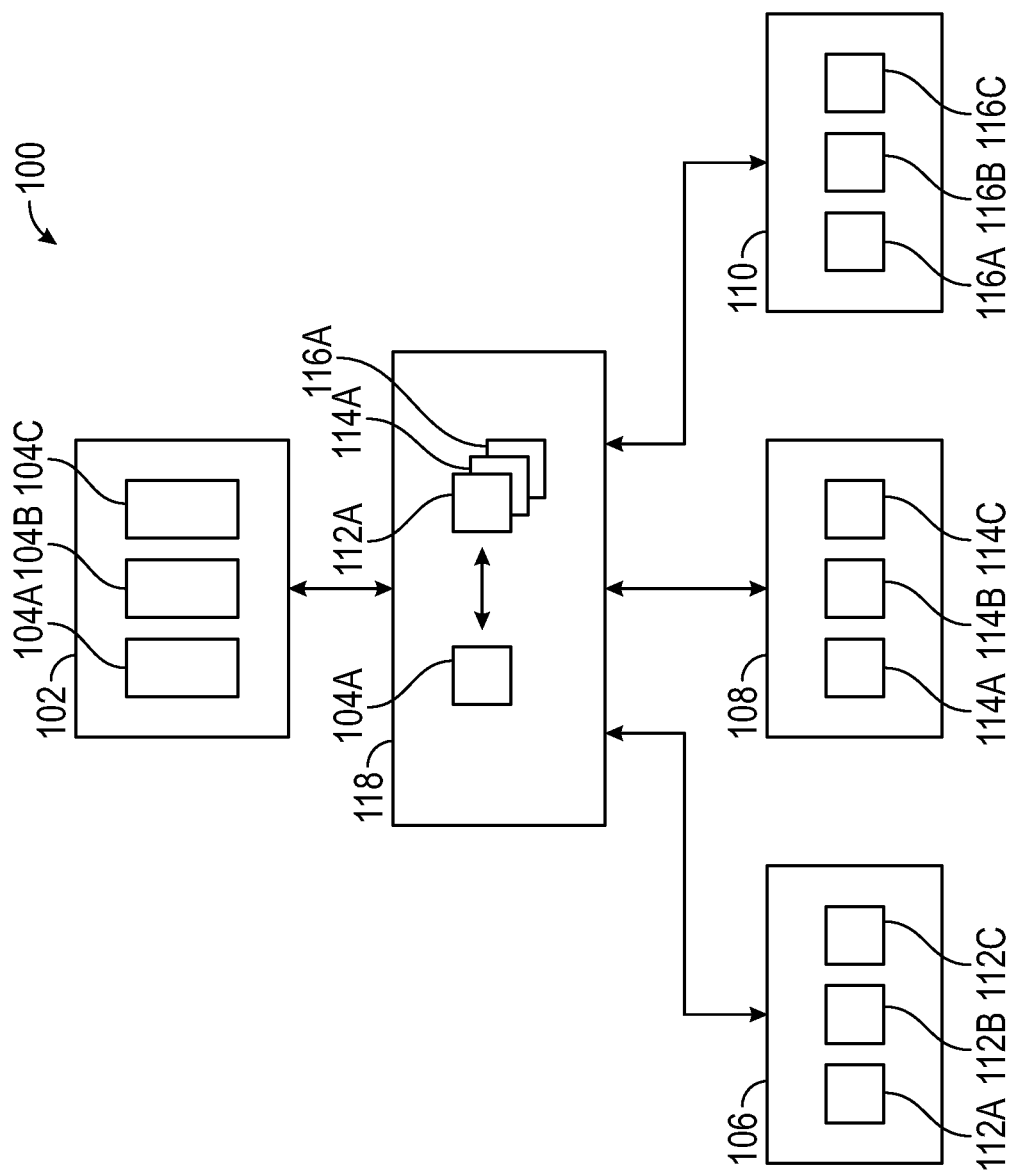
FIG. 1 illustrates a computing environment in which examples can operate, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

As mentioned above, a container image can be stored at a remote source and then downloaded by a provider where the provider then uploads the container image to a cloud-computing system. In particular, a registry can store a master copy of container images that are downloaded to different cloud-computing systems. However, if multiple cloud-computing systems are each using the container image thousands of times, the provider downloads the container image from the registry thousands of times and then uploads the container image thousands of times to the cloud-computing systems.

Accordingly, a need exists for a system that can compare container images on a master copy stored at a remote source with container images stored at a registry at a cloud-computing system. The system should be able to download a single instance of a container image based on the comparison and provide multiple copies of the container image to cloud-computing systems using the single instance.

Examples relate to a registry synchronization service that is configured to synchronize a master copy of container images stored at a remote source with a list of container images stored at a cloud-computing system registry. The registry synchronization service can read a master copy of container images stored at a remote source and read a list of container images stored at a cloud-computing system registry. In examples, the registry synchronization service can compare the master copy of container images with the list of container images stored at the cloud-computing system registry. Based on the comparison, the registry synchronization service can synchronize the list of container images stored at the cloud-computing system registry with the master copy of container images. Synchronization can include deleting container images stored at the cloud-computing system along with providing container images to be stored at the cloud-computing system. In examples, the cloud-computing system may not include any of the container images listed on the master copy. The registry synchronization service can ensure that all the container images listed on a master copy are also at the cloud-computing system.

In examples, the registry synchronization service can download a single instance of the container image from a remote source that has the master copy of container images and push a copy of the single instance of the container image to multiple repositories associated with a cloud-computing system registry. More specifically, using the single instance of the downloaded container image, the registry synchronization system can create multiple copies of the container image and push the copies of the single instance to multiple repositories associated with cloud-computing system registries.

In examples, synchronization between the master copy of container images and the list of container images at the cloud-computing system registry can include comparing tags associated with the container images listed on the master copy with tags associated with the container images listed on the cloud-computing system list. During synchronization, when a match between tags is found, digests associated with the tags can be compared. Thus, dual authorization can be implemented to determine that container images listed on the cloud-computing system list are the most up to date versions: the tag and the digest associated with the tag. Furthermore, the registry synchronization service can determine where differences exist between the master copy of container images and the list of container images at the cloud-computing system registry.

Examples improve the functioning of computing devices. As will be discussed below, examples relate to a computing device that implements a registry synchronization service that can compare a master registry with remotely located registries. In particular, the computing device implementing the registry synchronization service can access lists that list thousands of container images and compare these lists with lists that are stored at remote cloud-computing systems. In addition, the computing device implementing the registry synchronization service can synchronize the lists stored at the remote cloud-computing systems by deleting container image listings from the stored lists and adding container images listings. The improvement lies in the computing device being able to perform these comparisons and synchronizations in real time and conserving network resources, i.e., storage at the cloud-computing system is freed up upon removal of unnecessary container images. Moreover, the improvement lies in a computing device being able to push a container image to multiple cloud-computing systems, which can conserve network resources and network infrastructure since the computing device can download a single copy of a container image that can be pushed to thousands of destinations. Examples ensure that thousands of container image listings across multiple lists are synchronized with each other such that all the lists include similar information.

Now making reference to FIG. 1, an environment 100 is shown in which examples can operate. The environment 100 can include a remote source 102, which can be a third-party container registry, such as a JFrog™ Artifactory™ container registry available from JFrog™ having a U.S. headquarters in Sunnyvale, Ca. In examples, the remote source 102 can include a registry that stores master copies 104A-104C of container image lists. Throughout this document, master copy 104 will be interchangeably used with master copies 104A-104C. It should be noted that any discussion relating to the master copy 104 is equally applicable to the master copies 104A-104C and vice versa.

Container images can include files that are used to create an instance of an application on an end-user device implemented by various end-users. In particular, a container image can be a snapshot of an application that can be loaded into an executable environment for running in the executable environment. Examples of applications that can be run using the container images can include Apache Kafka™, Kafka™ structured query language (KSQL), SchemaRegistry, Connect, or the like. Examples of environments that can run the applications can include Kubernetes, Docker™, or any other type of container environment. The environments that can run applications can be hosted at cloud-computing systems 106-110. Examples of the cloud-computing systems 106-110 can include Amazon Web Services™ (AWS™), IBM Cloud™, Google Cloud Platform™, Microsoft Azure™, Elastic Container Registry available from AWS™, Google Container Registry available from Google, Azure Container Registry available from Microsoft™, and the like.

Each of the cloud-computing systems 106-110 can include container image lists. In particular, the cloud-computing system 106 can include container image lists 112A-112C, the cloud-computing system 108 can include container image lists 114A-114C, and the cloud-computing system 110 can include container image lists 116A-116C. In examples, the container image lists 112A-112C, 114A-114C, and 116A-116C can match the master copies 104A-104C. Thus, the information in the container images lists 112A-112C, 114A-114C, and 116A-116C mirror the master copies 104A-104C.

The container image lists 112A-112C, 114A-114C, and 116A-116C can correspond to tags for container images that are implemented at containers associated with each of the cloud-computing systems 106-110. More specifically, the container image lists 112A-112C, 114A-114C, and 116A-116C can correspond to registries associated with each of the cloud-computing system 106-110 where registries can include a listing of container images stored at repositories associated with the registries. An example of the association of the registries and the repositories for a cloud-computing system is shown with reference to FIG. 2.

Figure 2:
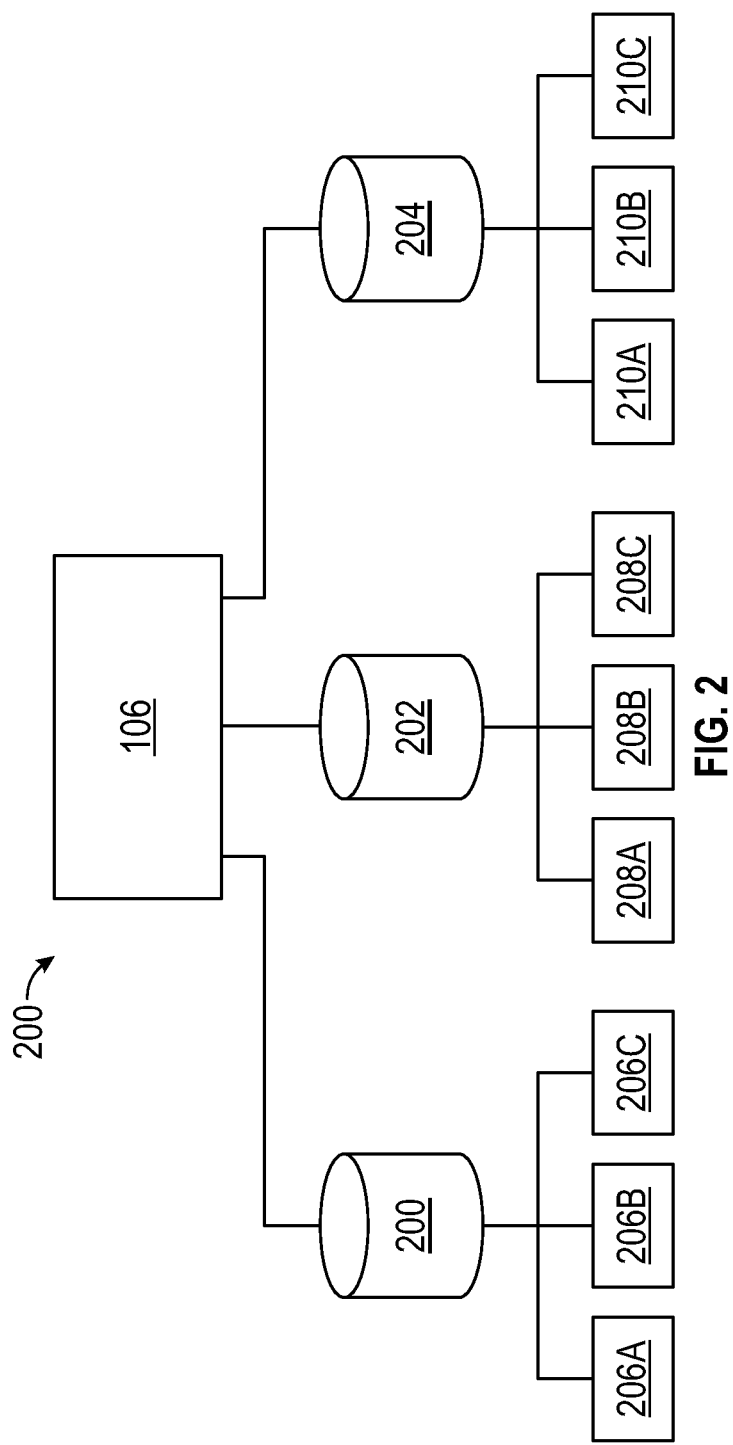
FIG. 2 illustrates a hierarchical structure of cloud-computing system registries associated with a cloud-computing system, according to some examples.

FIG. 2 illustrates a hierarchical structure of cloud-computing system registries 200-204 associated with the cloud-computing system 106. It should be noted that the hierarchical structure shown with reference to FIG. 2 is equally applicable to each of the cloud-computing systems 108 and 110. The cloud-computing system registry 200 can have repositories 206A-206C associated therewith. The cloud-computing system registry 202 can have repositories 208A-208C associated therewith while repositories 210A-210C can be associated with the cloud-computing system registry 204. In examples, each of the repositories 206A-206C, 208A-208C, and 210A-210C store container image lists. In examples, the cloud-computing system registries 202-204 can pull the lists from each of the repositories 206A-206C, 208A-208C, and 210A-210C and provide the pulled lists to the cloud-computing system 106. In examples, the pulled lists from the repositories 206A-206C, 208A-208C, and 210A-210C can form the container image lists 112A-112C.

Figure 3:
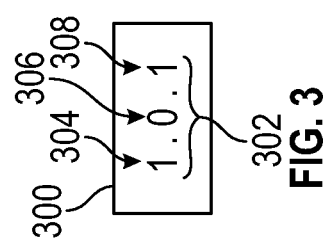
FIG. 3 shows a tag that can accompany a container image, according to some examples.

The master copies 104A-104C can list the most recent versions of container images. In examples, each of the container image listings in the master copies 104A-104C can include tags 300 that can be any type of text string that can be used to identify the container image. To further illustrate, a container image listed in the master copy 104A can have the tag 300 associated therewith, as shown with reference to FIG. 3. The tag 300 can include an alphanumeric string 302 having identifiers 304-308. Here, the identifiers 304 and 308 can correspond to the digit "1," while the identifier 306 can correspond to the digit "0." In examples, the alphanumeric string 302 can correspond to a version of a container image listed on the master copies 104A-104C. In examples, when the container image having the alphanumeric string 302 is updated, any or all of the identifiers 304-308 can be updated to reflect the updated version of the container image.

Figure 4:
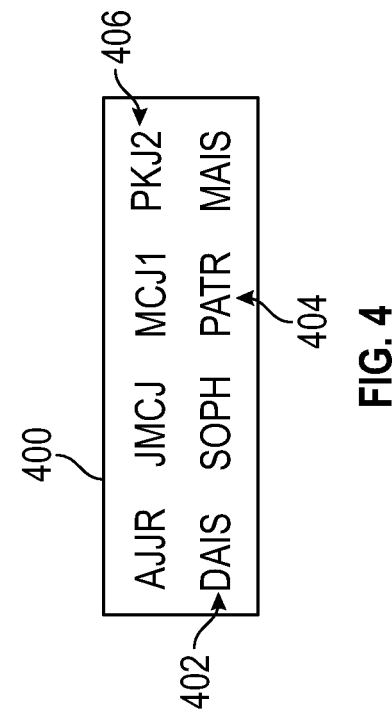
FIG. 4 illustrates a digest that can accompany the tag of FIG. 3, according to some examples.

The tag 300 can have a digest 400 associated therewith, as shown with reference to FIG. 4. The digest 400 can include values 402-406, which can be generated via any type of message digest hashing algorithm, such as the MD5 message-digest algorithm. In examples, the values 402-406 can correspond to hashes. The digest 400 having the values 402-406 can be unique to the tag 300. Thus, in examples, all instances of the tag 300 can have the digest 400 that includes the values 402-406. The digest 400 can be used to determine if the tag 300 matches another tag, as will be discussed further on. In examples, container image lists, such as the master copies 104A-104C and the container image lists 112A-112C, 114A-114C, and 116A-116C, include tags and digests. In particular, each entry in the container image lists is associated with a tag and a digest, such as the tag 300 and the digest 400.

Changes can be made to container images, such as an upgrade, where the upgraded container image should be forwarded along to containers in a container environment. Accordingly, applications that can be run with the container image and environments that run the container image should implement the upgraded container image. Moreover, container images can be created and added to the master copies 104A-104C. In addition, containers may no longer need container images.

In examples, when container images are updated, the master copies 104A-104C are updated to reflect that the container image has been updated. Similarly, when container images are added, the master copies 104A-104C are updated to reflect the new container images. In examples where containers no longer implement a specific container image, the container image can be deleted from the master copies 104A-104C.

In order to ensure that the container images listed on the master copies are present at the cloud-computing systems 106-110, examples can implement a registry synchronization service 118. The registry synchronization service 118 can compare the container images on the master copies 104A-104C with the container image lists 112A-112C, 114A-114C, and 116A-116C. In examples, the registry synchronization service 118 can obtain the master copies 104A-104C from the remote source 102. In addition, the registry synchronization service 118 can obtain the container image lists 112A-112C, 114A-114C, and 116A-116C from each of the cloud-computing systems 106-110. The registry synchronization service 118 can compare the container images listed on the master copies 104A-104C with the container image lists 112A-112C, 114A-114C, and 116A-116C.

Based on the comparison, the registry synchronization service 118 can synchronize the container images listed on the master copies 104A-104C with the container image lists 112A-112C, 114A-114C, and 116A-116C. The registry synchronization service 118 can download a single instance of the container image from the remote source 102 and push copies of the single instance of the container image to multiple repositories associated with a cloud-computing system registry. More specifically, using the single instance of the downloaded container image, the registry synchronization system 118 can create multiple copies of the container image using the single instance and push the copies of the single instance to multiple repositories associated with cloud-computing system registries.

The listing of the container image from the container image lists 112A-112C, 114A-114C, and 116A-116C using any type of tool that can manage content of remote registries. Examples can include skopeo that can issue the following command: "skopeo delete docker://<registry>/<repository>:<tag>"

The registry synchronization service 118 can be configured to replicate the container image lists including tags and digests, such as the tag 300 and the digest 400, associated with each of the container images on the master copies 104A-104C to registries associated with the cloud-computing system 106-110. To further illustrate, the repositories 206A-206C, 208A-208C, and 210A-210C may not list container images listed on the master copies 104A-104C. In examples, the registry synchronization service 118 can replicate the container image lists including tags and digests, such as the tags 300 and the digests 400, associated with each of the container images on the master copies 104A-104C and push the replicated container image lists along with the tags and associated digests to the cloud-computing systems 106-110 for replication onto repositories associated with the cloud-computing systems 106-110, such as the repositories 206A-206C, 208A-208C, and 210A-210C.

An example of a tool that can be used to replicate the registry can include the skopeo tool. Examples that can implemented with Skopeo tool can include "skopeo copy <source-image> <destination-image>" that can copy a single container image from one repository to another and the "skopeo sync <source-repository> <destination-repository>" can copy all images found in the source repository to the destination repository. This can be considered a helper command, which can be equivalent to using the "skopeo list-tags" command followed by multiple "skopeo copy" commands.

Figure 5:
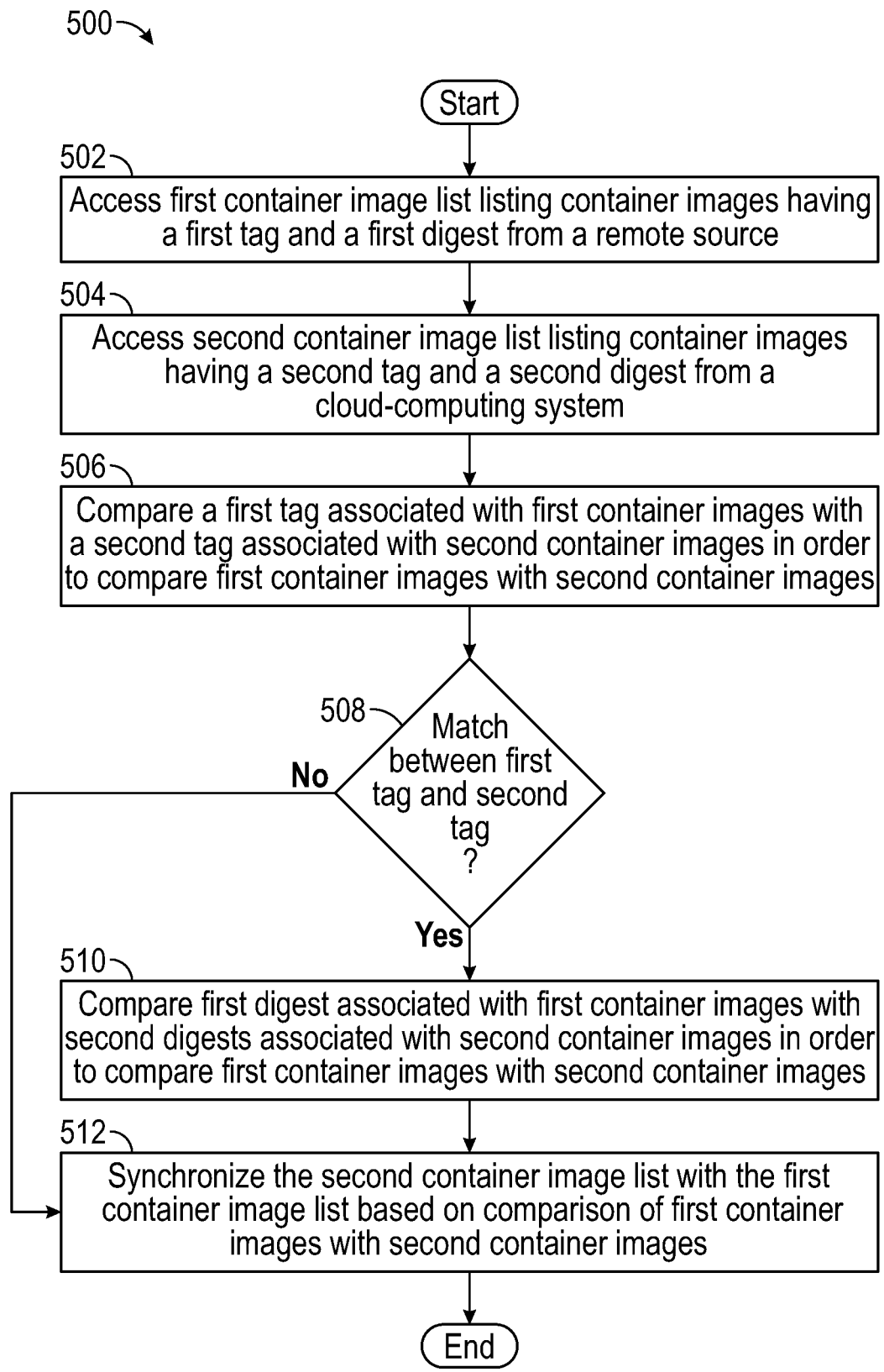
FIG. 5 shows a method for synchronizing a master list at a remote source with a container image list at a cloud-computing system, according to some examples.

To further illustrate the concept of the registry synchronization service 118 ensuring that the container images listed on the master copies 104A-104C are present at the cloud-computing system 106-110, reference is now made to FIG. 5, which illustrates a method 500 of synchronizing container images listed on a master copy with container images at a cloud-computing system. During an operation 502, a first container image list that lists container images each having a first tag and first digest associated with the first tag is accessed from a remote source. Thus, during the operation 502, first tags and first digests are also retrieved. In examples, a single remote source can be accessed for a single first container image list during the operation 502. However, examples are not limited to accessing a single first container image list from a remote source during the operation 502. Thus, multiple container image lists could be accessed from a remote source during the operation 502.

After completion of the operation 502, the method 500 performs an operation 504, where a second container image list that lists container images each having a second tag and second digest associated with the second tag is accessed from a cloud-computing system. Therefore, similar to the operation 502, during the operation 504, second tags and second digests are also retrieved. While the operation 504 is described as being performed after the operation 502, it should be noted that the operation 504 can be performed before the operation 502 or simultaneously with the operation 502. Regardless of when the operation 504 is performed, during the operation 504, any number of container image lists can be accessed from any number of cloud-computing systems. For example, container image lists can be obtained from ten different cloud-computing systems. Moreover, multiple container image lists can be obtained from a single cloud-computing system or multiple container image lists can be obtained from each cloud-computing system of multiple cloud-computing systems.

To further illustrate the method 500 and referred to herein as "the illustration," reference is now made to FIG. 1. During the operation 502, the registry synchronization service 118 can access the remote source 102 and the master copy 104A along with the tags and digests associated with each container image on the master copy 104A. Furthermore, during the operation 504, the registry synchronization service 118 can access the list 112A from the cloud-computing system 106, the list 114A from the cloud-computing system 108, and the list 116A from the cloud-computing system 110 along with the tags and the digests associated with each container image on the lists 112A-116A.

The registry synchronization service 118 use various tools to access each of 102 and 106-110. For example, the registry synchronization service 118 can use the Docker Registry HTTP API. Here, the registry synchronization service 118 can use the Docker Registry HTTP API by way of a third-party code library, which implements a client for the Docker Registry HTTP API.

Furthermore, implementations of a container registry can provide a unique API that is specific to that registry implementation. Here, an implementation-specific API can provide additional operations (such as managing access permissions on a repository) and/or provide equivalent behaviors to the Docker Registry HTTP API.

Returning to FIG. 5 and the method 500, after the first and second container image lists are accessed during the operations 502 and 504, the method 500 performs an operation 506, where the first tags associated with the first container images are compared with the second tags associated with the second container images. The operation 506 can be performed during and as part of a comparison of the first container image list with the second container image list. In examples, the first and second tags can be used to determine if the second container images are the most up to date versions of the container images. Even though each of the first and second container image lists list the same container images, the version of the container images on the second list may not be the most up to date version, such as in the scenario where container images on the first container image list have been updated. In examples, the first and second tags can be used to determine if the version of the container image on the second container image list is the most up to date version. More specifically, the comparison between the first and second tags can make an initial determination regarding whether or not the container images listed on the second container image list are up to date.

Furthermore, in some examples, where the first list is obtained from a master registry, such as the master copies 104A-104C, and the second list is from a cloud-computing system, such as the container image lists 112A-112C, 114A-114C, and 116A-116C, instances may occur where the container image lists 112A-112C, 114A-114C, and 116A-116C list a container image that is not on the master copies 104A-104C. Moreover, as will be discussed further below, the container image lists 112A-112C, 114A-114C, and 116A-116C can be updated to remove the container image referenced in the container image lists 112A-112C, 114A-114C, and 116A-116C.

In some instances, the master copies 104A-104C may list container images that are not listed on the container images lists 112A-112C, 114A-114C, and 116A-116C. Here, the registry synchronization service 118 can download a single instance of the container image listed on the master copies 104A-104C and not on the container images lists 112A-112C, 114A-114C, and 116A-116C and then push copies of the single instance of the container image to the repositories 206A-206C, 208A-208C, and 210A-210C.

Returning to the illustration, a container image on the master copy 104A can include the tag 300 that has the identifiers 304-308. Moreover, in the illustration, a container image in the container image list 112A can have a tag 600 that includes an alphanumeric string 602 along with identifiers 604-608. The identifiers 604 and 608 can correspond to the digit "1," while the identifier 606 can correspond to the digit "0." In the illustration, a container image in the container image list 114A can have a tag 700 that includes an alphanumeric string 702 along with identifiers 704-708. The identifier 704 can correspond to the digit "1," while the identifiers 706 and 708 can correspond to the digit "0." Furthermore, in the illustration, a container image in the container image list 116A can have a tag 800 that includes an alphanumeric string 802 along with identifiers 804-808. In the illustration, the identifiers 804 and 808 can correspond to the digit "1," while the identifier 806 can correspond to the digit "0."

During the operation 506, the registry synchronization service 118 compares the tag 300 along with the identifiers 304-308 with each of the tags 600-800 and the identifiers 604-608, 704-708, and 804-808. More specifically, during the operation 506, the registry synchronization service 118 compares the tag 300 with the tag 600. During the comparison between the tag 300 and the tag 600, the identifiers 304-308 can be compared with the identifiers 604-608. In examples, any differences between the identifiers 304-308 and the identifiers 604-608 can be indicative of a difference between the container image associated with the tag 300 and the container image associated with the tag 600. As mentioned above, the difference can occur when the container image at the master copy 104A has been updated and the container image at the container associated with the repository listing the container image associated with the tag 600 has not been updated. In the illustration, the identifier 304 and the identifier 604 each correspond to the digit "1," the identifier 306 and the identifier 606 each correspond to the digit "0,", and the identifier 308 and the identifier 608 each correspond to the digit "1." In the illustration, a determination regarding whether or not tags from the maters copy 104A exist in the lists 112A-112C, 114A-114C, and 116A-116C.

Additionally, during the operation 506, the registry synchronization service 118 compares the tag 300 with the tag 700. During the comparison between the tag 300 and the tag 700, the identifiers 304-308 are compared with the identifiers 704-708. In examples, any differences between the identifiers 304-308 and the identifiers 704-708 can be indicative of a difference between the container image associated with the tag 300 and the container image associated with the tag 700. In the illustration, the identifier 304 and the identifier 704 each correspond to the digit "1," the identifier 306 and the identifier 706 each correspond to the digit "0," the identifier 308 corresponds to the identifier "1," while the identifier 708 corresponds to the digit "0." As such, in the illustration, during the operation 506, the registry synchronization service 118 determines that the tag 300 is different from the tag 700.

The registry synchronization service 118 also compares tag 300 with the tag 800 during the operation 506. During the comparison between the tag 300 and the tag 800, the identifiers 304-308 are compared with the identifiers 804-808. In examples, any differences between the identifiers 304-308 and the identifiers 804-808 can be indicative of a difference between the container image associated with the tag 300 and the container image associated with the tag 800. In the illustration, the identifier 304 and the identifier 804 each correspond to the digit "1," the identifier 306 and the identifier 806 each correspond to the digit "0," and the identifier 308 and the identifier 808 each correspond to the digit "1."

Returning to the method 500 and FIG. 5, after the tags are compared during the operation 506, the method 500 determines if there is a match between the first tag and the second tag during an operation 508. In examples, if there is a match between the first tag and the second tag, the method 500 performs an operation 510. Otherwise, the method 500 performs an operation 512.

During the operation 510, a first digest associated with a first container image is compared with a second digest associated with a second container image. As discussed above, each of the tags associated with container images listed in the media copies 104A-104C can have digests associated therewith that can be generated via any type of message digest hashing algorithm. In examples, the digest can be unique to a particular tag such that if container images in different lists, such as the master copy 104A and each of the container image lists 112A, 114A, and 116A, have the same tag and the same digest, the container images associated with the listed container images in the container image lists 112A, 114A, and 116A and the master copy 104A are identical, i.e., they are the same version. In further examples, if container images listed in the master copy 104A and the container image lists 112A, 114A, and 116A have matching tags but different digests, then the container images associated with the listed container image in the container image lists 112A, 114A, and 116A are not identical to the container image associated with the container images listed in the master copy 104A, i.e., they are different versions. In examples, the operation 510 can be used to confirm that container images associated with container images listed in cloud-computing system lists are identical to container images associated with listed container images in master lists.

Referring back to the illustration, as noted above, during the comparison in the operation 506, the registry synchronization service 118 determined that identifiers 604-608 of the tag 600 and the identifiers 804-808 of the tag 800 are the same as the identifiers 304-308 of the tag 300. Thus, during the operation 508, the registry synchronization service 118 determines that the tag 300 matches the tags 600 and 800. Accordingly, the registry synchronization service 118 performs the operation 510.

The tag 600 includes a digest 900 having values 902-906. Similar to the values 402-406, in examples, the values 902-906 can be hashes created with a hashing algorithm. During the operation 510, the registry synchronization service 118 compares the values 402-406 associated with the digest 400 with the values 902-906. The value 402 corresponds to "DAIS," the value 404 corresponds to "PATR," and the value 406 corresponds to "PKJ2." Thus, in order for the digest 900 to match with the digest 400, the values 902-906 should be the same as the values 402-406. In examples, if the values 902-906 are the same as the values 402-406, this can mean that a container image associated with the container image listing having the tag 600 and the digest 900 is the same as the container image associated with the container image listing having the tag 300 and the digest 400. In the illustration, the value 902 corresponds to "1ZO6," the value 904 corresponds to "E350," and the value 906 corresponds to "FPLC." Since the values 402-406 and the values 902-906 are not the same, the digest 900 does not match the digest 400. Thus, in the illustration, the container image associated with the container image listing having the tag 600 and the digest 900 is not the same as the container image associated with the container image listing in the master copy 104A having the tag 300 and the digest 400. As can be appreciated, the dual authorization provided by the tags and the associated digests can be used to avoid situations where tags match and a potential update for a container image is missed since the associated digests do not match.

Still sticking with the illustration, the tag 800 can include the digest 1000 having values 1002-1006. Similar to the values 402-406, in examples, the values 1002-1006 can be hashes created with a hashing algorithm. During the operation 510, the registry synchronization service 118 compares the values 402-406 associated with the digest 400 with the values 1002-1006. Again, the value 402 corresponds to "DAIS," the value 404 corresponds to "PATR," and the value 406 corresponds to "PKJ2." In the illustration, the value 1002 corresponds to "DAIS," the value 1004 corresponds to "PATR," and the value 1006 corresponds to "PKJ2." Since the values 402-406 and the values 1002-1006 are the same, the digest 1000 matches the digest 400. Thus, in the illustration, the container image associated with the container image listing having the tag 800 and the digest 1000 is the same as the container image associated with the container image listing in the master copy 104A having the tag 300 and the digest 400.

In the illustration, as noted above, during the comparison in the operation 506, the registry synchronization service 118 determined that the identifiers 704-708 are not the same as the identifiers 304-308 of the tag 300. Thus, with respect to the tag 700, the registry synchronization service 118 skips the operation 510 and instead performs the operation 512.

Returning attention to FIG. 5 and the method 500, upon completion of the operation 510, the method 500 performs the operation 512, where the second container image list is synchronized with the first container image list based on comparing the first container image list with the second container image list. During the operation 512, in scenarios where a tag associated with a container image listed in one of the container image lists 112A-112C, 114A-114C, and 116A-116C does not match a tag associated with the same container image in the master copies 104A-104C, i.e., the version associated with the container image lists 112A-112C, 114A-114C, and 116A-116C is not the same as the version associated with the master copies 104A-104C, the container image associated with the container image listed in the container images lists 112A-112C, 114A-114C, and 116A-116C can be updated with the container image associated with the master copies 104A.

Synchronization can also include deletion of container images in registries associated with the cloud-computing system 106-110. As an example, if the container image lists 112A-112C, 114A-114C, and 116A-116C include a container image listing that is not in the master copies 104A-104C, during synchronization, the container image can be deleted from the cloud-computing systems 106-110 and the container image lists 112A-112C, 114A-114C, and 116A-116C. Moreover, the tag and digest associated with the deleted container image along with the listing in the container image lists 112A-112C, 114A-114C, and 116A-116C can be deleted.

In the illustration, as discussed above, during the operation 506, the registry synchronization service 118 determined the tag 300 was different from the tag 700. Thus, during the operation 508, the registry synchronization service 118 determines that the tag 300 does not match the tag 700 and performs the operation 512. The registry synchronization service 118 can delete an image/tag if the tag found in the destination list is not present in the source list. In particular, the registry synchronization service 118 can download the container image associated with the tag 300 from the remote source 102. Furthermore, the registry synchronization service 118 can push a copy of the container image to the cloud-computing system 108. Moreover, the container image list 114A can be updated with a new tag that corresponds to the tag 300 and a digest associated with the new tag that corresponds to the digest 400. Thus, if no other updates or deletions are made at the master copy 104A, during a subsequent comparison, the tags and digests will match.

Staying with the illustration, during the operation 510, the registry synchronization service 118 determined that the digest 900 associated with the tag 600 differed from the digest 400 associated with the tag 300 even though the tag 600 matched the tag 300. Accordingly, during the operation 512, the registry synchronization service 118 synchronizes the container image list 112A with the master copy 104A by deleting the container image at the cloud-computing system 106 associated with the tag 600 and the digest 900 and pushing a copy of the container image to the cloud-computing system 106. Here, instead of having to download another copy of the container image associated with the tag 300 and the digest 400, the registry synchronization service 118 can make another copy of the container image associated with the tag 300 and the digest 400 already downloaded from the remote source 102 for the cloud-computing system 108 and push the additional copy of the cloud-computing system 106 during the synchronization in the operation 512. Additionally, the container image list 112A can be updated with a new tag that corresponds to the tag 300 and a digest associated with the new tag that corresponds to the digest 400. Thus, if no other updates or deletions are made at the master copy 104A, during a subsequent comparison, the tags and digests will match. As may be appreciated, instead of the registry synchronization service 118 having to download the same container image multiple times for dissemination to multiple cloud-computing systems, such as the cloud-computing systems 106 and 108, the registry synchronization service 118 can download the container image once, make multiple copies, and then push ones of the multiple copies to different cloud-computing systems.

With respect to the container image list 116A and the container image associated with the tag 800 and the digest 1000, since there were no differences between the tags 300 and 800 along with the digests 400 and 1000, no updates are required to the container image list 116A with respect to the container image associated with the tag 800 and the digest 1000. Upon completion of the operation 512, the method 500 is complete.

In examples, a cadence associated with how often the registry synchronization service 118 performs the method 500 is variable. For example, the registry synchronization service 118 can perform the method 500 at five minute intervals, fifteen minute intervals, thirty minute intervals, hourly intervals, or any other time interval. Moreover, the cadence can be changed, where, initially, the registry synchronization service 118 can perform the method 500 at a cadence of every fifteen minutes and then switch to a cadence of every five minutes. In examples, the number of container images that will be compared and synchronized during the method 500 can also be controlled. An upper limit that the registry synchronization service 118 will compare and synchronize per repository, such as 1,000, can be set.

In some examples, after the registry synchronization service 118 accesses the first and second lists during the operations 502 and 504, the registry synchronization service 118 can sort the container image lists in the main copies 104A-104C and the container images lists 112A-112C, 114A-114C, and 116A-116C. For example, the registry synchronization service 118 can sort the first and second lists according to a semantic version of the container images associated with the container image lists. To further illustrate, the registry synchronization service 118 can sort the first and second lists according to time stamps where the more recently added or updated container images and the lists referencing the container images are compared and synchronized as detailed above with reference to FIG. 5 and the method 500.

Additionally, the registry synchronization service can select an optimal registry from which to copy images. In particular, when copying a container image to a destination registry, if the registry synchronization service 118 does not have a local copy of the container image, the registry synchronization service 118 can download the container image from any configured registry (the master or one of the destinations) if the registry synchronization service 118 knows that the registry has the container image. the registry synchronization service 118 can select the registry from which to download the image based on a configured metric (called "cost" in the Registry Sync implementation), preferring the registry with the lowest metric. The operator of the Registry Sync service can define and specify the metric according to, as an example, the relative monetary cost of transferring a container image from each registry. In this way, the Registry Sync service can optimize costs associated with operating the service. Additional costs can include network usage, latency, jitter, and the like.

In further examples, the registry synchronization service 118 can support configuring "tag filters." A filter can be a pattern (specified, for example, as a regular-expression or "regex") against which tags can be matched before considering the tags for syncing as discussed above. To further illustrate, a user can upload production images with the tags "1.0.0" and "1.0.1." Moreover, the user can upload images having developmental or test builds with tags such as "1.0.1-rc1" or "my-test." The registry synchronization service 118 can be configured with a tag filter like "^[0-9]+(\.[0-9]+){2}$", which can be a regular expression that would match a tag consisting of three numbers (a "number" being one or more digits of 0-9) separated by periods. Using this filter, the registry synchronization service 118 can sync the tags "1.0.0" and "1.0.1" while not syncing the tags "1.0.1-rc1" nor "my-test." The tags 300, 600, 700, and 800 discussed above can be filtered as discussed herein where the comparison detailed above can include comparing these tag filters.

In further examples, the registry synchronization service 118 can support configuring a repository "prefix" for each registry thereby renaming repositories. The prefix services can restrict sets of repositories, such as the repositories 206A-206C, 208A-208C, and 210A-210C, which the registry synchronization service 118 considers for syncing. For example, by configuring a prefix of "containers/release" for the source registry, the registry synchronization service 118 can sync tags from the repositories "containers/release/kafka" and "containers/release/ksql" but not the repositories "containers/devel/kafka" or "images/kafka." Furthermore, prefix services can support renaming repositories. If a source registry, such as one of the repositories 206A-206C, 208A-208C, and 210A-210C, is configured with a prefix of "containers/release" and a destination registry is configured with a prefix of "prod," then when the registry synchronization service 118 synchronizes a repository "containers/release/kafka" in the source registry, the registry synchronization service 118 can put those images in a repository "prod/kafka" in the destination registry. Here, the repositories 206A-206C, 208A-208C, and 210A-210C can include the prefixes and, during the operation 504 detailed above, the repositories 206A-206C, 208A-208C, and 210A-210C from which the second container image lists are pulled can be filtered according to prefixes associated with the repositories 206A-206C, 208A-208C, and 210A-210C. Repositories associated with the cloud-computing systems 106-108 can have the prefixes and, during the operation 504 detailed above, the cloud-computing systems 106-108 from which the second container image lists are pulled can be filtered according to prefixes associated with the cloud-computing systems 106-108.

The registry synchronization service 118 can maintain a local cache of the contents (tags and digest) of each registry, such as the repositories 206A-206C, 208A-208C, and 210A-210C. By referencing this cache and updating it as the registry synchronization service 118 makes changes to the registries (copying and deleting tags/images), the registry synchronization service 118 can avoid the need to repeatedly fetch the contents of each registry. This can reduce the amount of network requests sent to each registry, the amount of network traffic produced, and the time required for each synchronization cycle.

In examples, the registry synchronization service 118 can be capable of the following: filtering sets of repositories according to prefixes, filtering the set of tags from each repository according to tag filters, and replicating the set of source images to multiple destinations. Moreover, the registry synchronization service 118 can rename the repository according to configured prefixes and select an optimal registry from which to copy images. In addition, the registry synchronization service 118 can delete images from a destination, such as the repositories 206A-206C, 208A-208C, and 210A-210C, that do not exist in the source and cache repository contents in order to optimize any future synchronization processes. In particular, the registry synchronization service 118 can cache images such that the registry synchronization service 118 does not have to pull the image from a source during subsequent synchronization processes, as detailed above.

Any of the machines, databases, or devices shown in FIGS. 1 and 2 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 11 and 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices. In examples, communication links between elements shown in FIGS. 1 and 2 are implemented via one or more data communication networks. These data communication networks may utilize any wired or wireless communication protocol and any type of communication medium. In some embodiments, the data communication networks are a combination of two or more data communication networks (or sub-networks) coupled to one another.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-9 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the inventive subject matter in different contexts from the disclosure contained herein.

Example 1 is a method of synchronizing a first container image list with a second container image list, the method comprising: accessing the first container image list from a remote source where first container images listed in the first container image list include, a first tag and a first digest associated with the first tag; accessing the second container image list from a cloud-computing system registry where second container images listed in the second container image list include a second tag and a second digest associated with the second tag; comparing the first container images with the second container images by: comparing first tags associated with the first container images with second tags associated with the second container images, the comparison including comparing prefixes associated with the first tags and the second tags; and comparing first digests associated with the first container images with second digests associated with the second container images based on the comparison of the first tags with the second tags; and synchronizing the first container image list with the second container image list based on the comparison of the first container images with the second container images.

In Example 2, the subject matter of Example 1 includes, wherein synchronizing includes: downloading a container image listed on the first container image list from the remote source; creating copies of the downloaded container image listed on the first container image list; pushing a first copy of the copies of the downloaded container image to a first repository associated with the cloud-computing system registry; and pushing a second copy of the copies of the downloaded container image to a second repository associated with the cloud-computing system registry.

In Example 3, the subject matter of Examples 1-2 includes, wherein a first digest of the first digests is compared with a second digest of the second digests when a match occurs between the first tag and second tag during the comparison.

In Example 4, the subject matter of Example 3 includes, wherein the first digest includes a hash and the second digest includes a hash that matches the first digest hash and the synchronization is performed based on the first digest hash matching the second digest hash.

In Example 5, the subject matter of Examples 1-4 includes, wherein comparing the first container images with the second container images further comprises: determining that a container image listed on the second container image list does not match with a container image listed on the first container image list; and synchronizing the first container image list with the second container image list includes deleting the container image listed on the second container image list from a repository associated with the cloud-computing system registry in response to determining that the container image listed on the second container image list does not match with the container image listed on the first container image list.

In Example 6, the subject matter of Examples 1-5 includes, wherein comparing the first container images with the second container images further comprises: determining that the first container image list includes a container image not listed on the second container image list; downloading an instance of the container image listed on the first container list and not listed on the second container image from the remote source; and synchronizing the first container image list with the second container image list includes adding the container image listed on the first container list and not listed on the second container image list to a repository associated with the cloud-computing system registry in response to determining that the container image listed on the first container list is not listed on the second container image list.

In Example 7, the subject matter of Examples 1-6 includes, wherein a first tag associated with a first container image has a first version number and a second tag associated with a second container image has a second version number and comparing the first container images with the second container images further comprises: comparing the first version number with the second version number; determining that the first version number is different from the second version number; downloading an instance of the first container image has the first version number from the remote source in response to response to determining that the first version number is different from the second version number; and synchronizing the first container image list with the second container image list includes adding the first container image to a repository associated with the cloud-computing system registry in response to determining that the first version number is different from the second version number.

In Example 8, the subject matter of Example 7 includes, wherein the first version number corresponds to a first alphanumeric string and the second version number corresponds to a second alphanumeric string and determining that the first version number is different from the second version number includes determining that a character of the first alphanumeric string is different from a character of the second alphanumeric string.

Example 9 is a system, comprising: at least one processor; and at least one memory including instructions that, when executed by the at least one processor, cause the at least one processor to perform operations comprising: accessing the first container image list from a remote source where first container images listed in the first container image list include, a first tag and a first digest associated with the first tag; accessing the second container image list from a cloud-computing system registry where second container images listed in the second container image list include a second tag and a second digest associated with the second tag; comparing the first container images with the second container images by: comparing first tags associated with the first container images with second tags associated with the second container images, the comparison including comparing prefixes associated with the first tags and the second tags; and comparing first digests associated with the first container images with second digests associated with the second container images based on the comparison of the first tags with the second tags; and synchronizing the first container image list with the second container image list based on the comparison of the first container images with the second container images.

In Example 10, the subject matter of Example 9 includes, wherein synchronizing includes: downloading a container image listed on the first container image list from the remote source; creating copies of the downloaded container image listed on the first container image list; pushing a first copy of the copies of the downloaded container image to a first repository associated with the cloud-computing system registry; and pushing a second copy of the copies of the downloaded container image to a second repository associated with the cloud-computing system registry.

In Example 11, the subject matter of Examples 9-10 includes, wherein a first digest of the first digests includes a hash and a second digest of the second digests includes a hash and the first digest is compared with second digest when a match occurs between the first tag and second tag during the comparison where the synchronization is performed based on the first digest hash matching the second digest hash.

In Example 12, the subject matter of Examples 9-11 includes, wherein comparing the first container images with the second container images further comprises: determining that a container image listed on the second container image list does not match with a container image listed on the first container image list; and synchronizing the first container image list with the second container image list includes deleting the container image listed on the second container image list from a repository associated with the cloud-computing system registry in response to determining that the container image listed on the second container image list does not match with the container image listed on the first container image list.

In Example 13, the subject matter of Examples 9-12 includes, wherein comparing the first container images with the second container images further comprises: determining that the first container image list includes a container image not listed on the second container image list; downloading an instance of the container image listed on the first container list and not listed on the second container image from the remote source; and synchronizing the first container image list with the second container image list includes adding the container image listed on the first container list and not listed on the second container image list to a repository associated with the cloud-computing system registry in response to determining that the container image listed on the first container list is not listed on the second container image list.

In Example 14, the subject matter of Examples 9-13 includes, wherein a first tag associated with a first container image has a first version number corresponding to a first alphanumeric string and a second tag associated with a second container image has a second version number corresponding to a second alphanumeric string and comparing the first container images with the second container images further comprises: comparing the first version number with the second version number; determining that a character of the first alphanumeric string is different from a character of the second alphanumeric string such that the first version number is different from the second version number; downloading an instance of the first container image has the first version number from the remote source in response to response to determining that the first version number is different from the second version number; and synchronizing the first container image list with the second container image list includes adding the first container image to a repository associated with the cloud-computing system registry in response to determining that the first version number is different from the second version number.

Example 15 is a non-transitory machine-readable medium having instructions embodied thereon, the instructions executable by a processor of a machine to perform operations comprising: accessing the first container image list from a remote source where first container images listed in the first container image list include, a first tag and a first digest associated with the first tag; accessing the second container image list from a cloud-computing system registry where second container images listed in the second container image list include a second tag and a second digest associated with the second tag; comparing the first container images with the second container images by: comparing first tags associated with the first container images with second tags associated with the second container images, the comparison including comparing prefixes associated with the first tags and the second tags; and comparing first digests associated with the first container images with second digests associated with the second container images based on the comparison of the first tags with the second tags; and synchronizing the first container image list with the second container image list based on the comparison of the first container images with the second container images.

In Example 16, the subject matter of Example 15 includes, wherein synchronizing includes: downloading a container image listed on the first container image list from the remote source; creating copies of the downloaded container image listed on the first container image list; pushing a first copy of the copies of the downloaded container image to a first repository associated with the cloud-computing system registry; and pushing a second copy of the copies of the downloaded container image to a second repository associated with the cloud-computing system registry.

In Example 17, the subject matter of Examples 15-16 includes, wherein a first digest of the first digests includes a hash and a second digest of the second digests includes a hash and the first digest is compared with second digest when a match occurs between the first tag and second tag during the comparison where the synchronization is performed based on the first digest hash matching the second digest hash.

In Example 18, the subject matter of Examples 15-17 includes, wherein comparing the first container images with the second container images further comprises: determining that a container image listed on the second container image list does not match with a container image listed on the first container image list; and synchronizing the first container image list with the second container image list includes deleting the container image listed on the second container image list from a repository associated with the cloud-computing system registry in response to determining that the container image listed on the second container image list does not match with the container image listed on the first container image list.

In Example 19, the subject matter of Examples 15-18 includes, wherein comparing the first container images with the second container images further comprises: determining that the first container image list includes a container image not listed on the second container image list; downloading an instance of the container image listed on the first container list and not listed on the second container image from the remote source; and synchronizing the first container image list with the second container image list includes adding the container image listed on the first container list and not listed on the second container image list to a repository associated with the cloud-computing system registry in response to determining that the container image listed on the first container list is not listed on the second container image list.

In Example 20, the subject matter of Examples 15-19 includes, wherein a first tag associated with a first container image has a first version number corresponding to a first alphanumeric string and a second tag associated with a second container image has a second version number corresponding to a second alphanumeric string and comparing the first container images with the second container images further comprises: comparing the first version number with the second version number; determining that a character of the first alphanumeric string is different from a character of the second alphanumeric string such that the first version number is different from the second version number; downloading an instance of the first container image has the first version number from the remote source in response to response to determining that the first version number is different from the second version number; and synchronizing the first container image list with the second container image list includes adding the first container image to a repository associated with the cloud-computing system registry in response to determining that the first version number is different from the second version number.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 11:
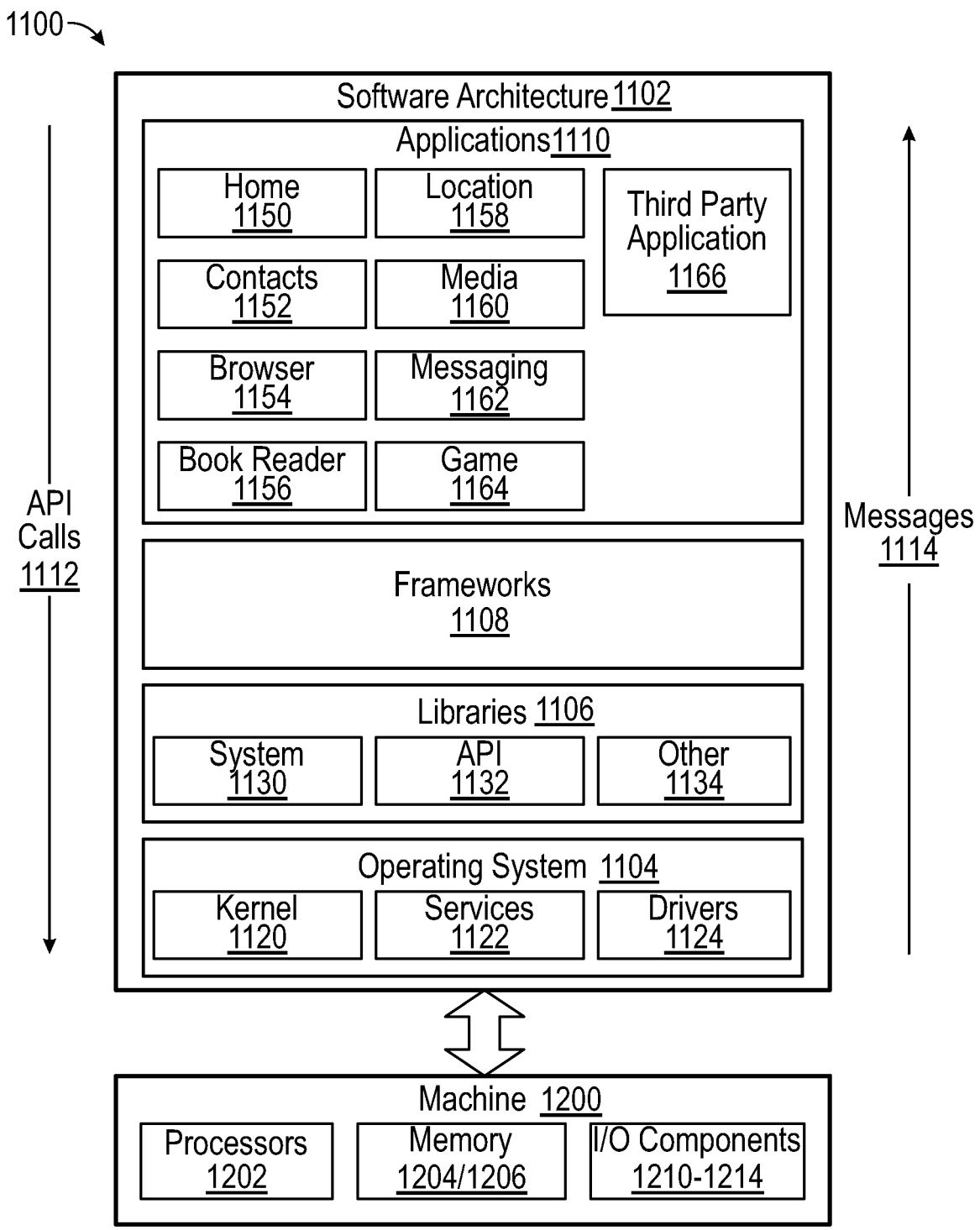
FIG. 11 is a block diagram illustrating architecture of software used to implement displaying an interactive user interface, according to some examples.
Figure 12:
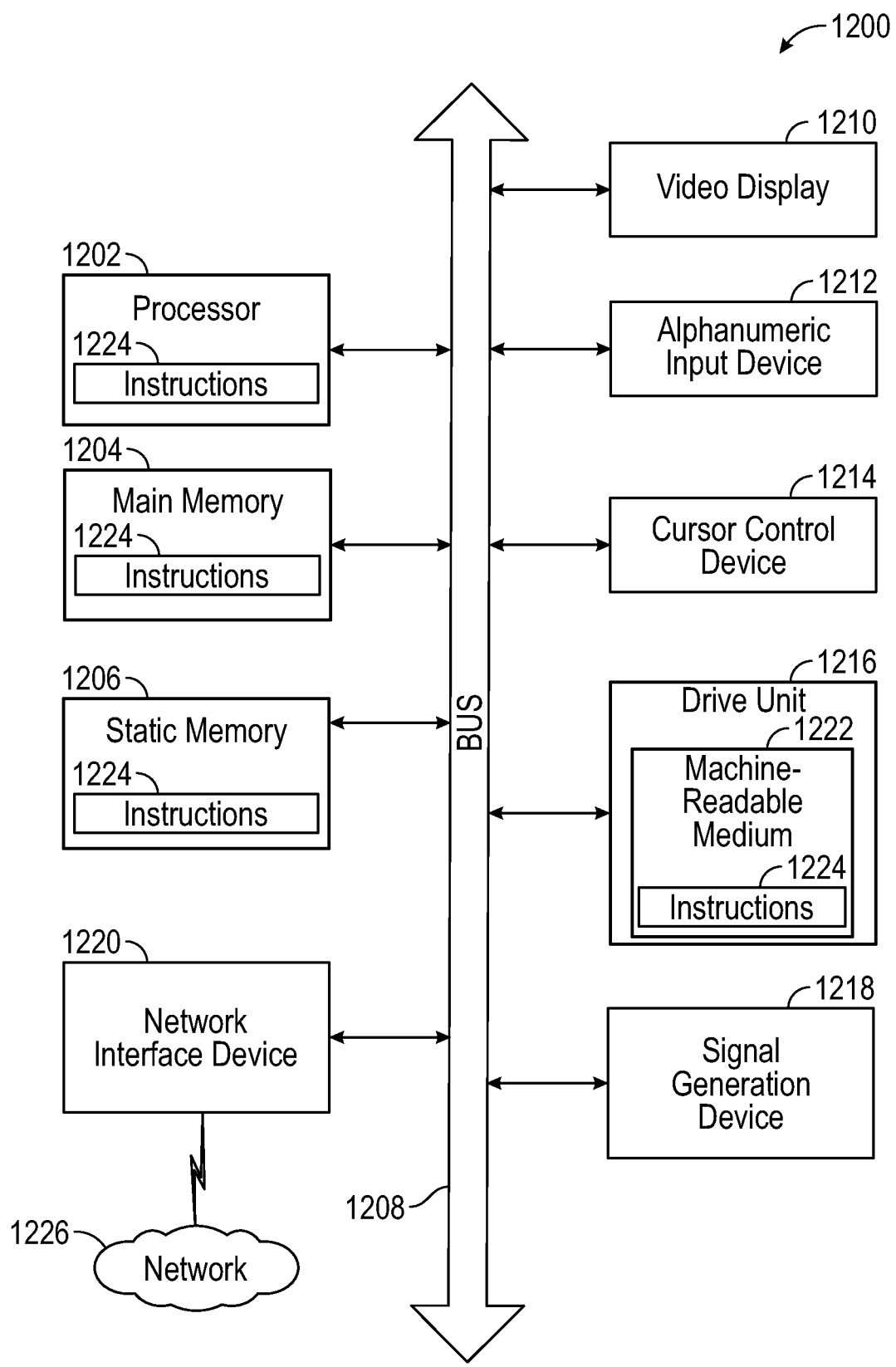
FIG. 12 shows a machine as an example computer system with instructions to cause the machine to implement displaying an interactive user interface, according to some examples.

FIG. 11 is a block diagram 1100 illustrating a software architecture 1102, which may be installed on any one or more of the devices described above. FIG. 11 is merely a non-limiting example of a software architecture, and it will be appreciated that many other architectures may be implemented to facilitate the functionality described herein. The software architecture 1102 may be implemented by hardware such as a machine 1200 of FIG. 12 that includes a processor 1202, memory 1204 and 1206, and I/O components 1210-1214. In this example, the software architecture 1102 may be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, according to some implementations.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers in some implementations. For example, the kernel 1120 provides memory management, processor management (e.g., scheduling), component management, networking, and security settings, among other functionality. The services 1122 may provide other common services for the other software layers. The drivers 1124 may be responsible for controlling or interfacing with the underlying hardware. For instance, the drivers 1124 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 1106 provide a low-level common infrastructure that may be utilized by the applications 1110. The libraries 1106 may include system libraries 1130 (e.g., C standard library) that may provide functions such as memory allocation functions, string manipulation functions, mathematic functions, and the like. In addition, the libraries 1106 may include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1106 may also include a wide variety of other libraries 1134 to provide many other APIs to the applications 1110.

The frameworks 1108 provide a high-level common infrastructure that may be utilized by the applications 1110, according to some implementations. For example, the frameworks 1108 provide various graphic user interface (GUI) functions, high-level resource management, high-level location services, and so forth. The frameworks 1108 may provide a broad spectrum of other APIs that may be utilized by the applications 1110, some of which may be specific to a particular operating system or platform.

In an example, the applications 1110 include a home application 1150, a contacts application 1152, a browser application 1154, a book reader application 1156, a location application 1158, a media application 1160, a messaging application 1162, a game application 1164, and a broad assortment of other applications such as a third-party application 1166. According to some examples, the applications 1110 are programs that execute functions defined in the programs. Various programming languages may be employed to create one or more of the applications 1110, structured in a variety of manners, such as object-orientated programming languages (e.g., Objective-C, Java, or C++) or procedural programming languages (e.g., C or assembly language). In a specific example, the third-party application 1166 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1166 may invoke the API calls 1112 provided by the mobile operating system (e.g., the operating system 1104) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

FIG. 5 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The machine 1200, which can be a computer system, includes the processor 1202 (e.g., a central processing unit (CPU), a graphics processing unit (GPU) or both), a main memory 1204 and a static memory 1206, which communicate with each other via a bus 1208. The machine 1200 may further include a video display unit 1210 (e.g., a liquid crystal display (LCD) or a cathode ray tube (CRT)). The machine 1200 also includes an alphanumeric input device 1212 (e.g., a keyboard), a user interface (UI) navigation device (cursor control device) 1214 (e.g., a mouse), a disk drive unit 1116, a signal generation device 1118 (e.g., a speaker) and a network interface device 1120.

The drive unit 1116 includes a machine-readable medium 1122 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the machine 1200, the main memory 1204 and the processor 1202 also constituting machine-readable media. Instructions 1224 may also reside within the static memory 1206.

While the machine-readable medium 1222 is shown in an example to be a single medium, the term "machine-readable medium" may include a single medium or multiple media (e.g., a centralized or distributed database, and/or associated caches and servers) that store the one or more instructions or data instructions 1224. The term "machine-readable medium" shall also be taken to include any tangible medium that is capable of storing, encoding or carrying instructions 1224 for execution by the machine and that cause the machine to perform any one or more of the methodologies of the present invention, or that is capable of storing, encoding or carrying data structures utilized by or associated with such instructions 1224. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and WiMax networks). The term "transmission medium" shall be taken to include any intangible medium that is capable of storing, encoding or carrying instructions 1224 for execution by the machine, and includes digital or analog communications signals or other intangible media to facilitate communication of such software.

Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Executable Instructions and Machine Storage Medium

The various memories and/or storage unit may store one or more sets of instructions and data structures (e.g., software) embodying or utilized by any one or more of the methodologies or functions described herein. These instructions, when executed by processor(s), cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various examples, one or more portions of network, such as the network-based system may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. To further illustrate, a network or a portion of a network may include a wireless or cellular network, where a coupling may be a Code Division Multiple Access (CDMA) connection, a Global System for Mobile communications (GSM) connection, or another type of cellular or wireless coupling. In this illustration, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

Instructions may be transmitted or received over a network using a transmission medium via a network interface device and utilizing any one of a number of well-known transfer protocols (e.g., hypertext transfer protocol (HTTP)). Similarly, the instructions may be transmitted or received using a transmission medium via the coupling (e.g., a peer-to-peer coupling) to devices. The terms "transmission medium" and "signal medium" mean the same thing and may be used interchangeably in this disclosure. The terms "transmission medium" and "signal medium" shall be taken to include any intangible medium that is capable of storing, encoding, or carrying instructions for execution by a machine, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A method of synchronizing a first container image list with a second container image list, the method comprising:

configuring a tag filter to compare different portions of a tag;
accessing the first container image list from a remote source where first container images listed in the first container image list include first tags each having a first portion and at least one of the first tags having a second portion, the first container image list including first digests associated with the first tags;
comparing first portions of the first tags with the tag filter during a first filtering process;
comparing second portions of the first tags with the tag filter during a second filtering process;
keeping the first container images having first tags that have passed only the first filtering process;
accessing the second container image list from a cloud-computing system registry where second container images listed in the second container image list include second tags, the second container image list including second digests associated with the second tags;
comparing the first container images with the second container images by:
comparing first tags that have passed only the first filtering process with the second tags associated with the second container images; and
determining that the first tags have passed only the first filtering process; and
synchronizing the first container image list with the second container image list based on the comparison of the first container images with the second container images, the synchronizing comprising:
downloading a container image listed on the first container image list from the remote source;
creating copies of the downloaded container image listed on the first container image list;
pushing a first copy of the copies of the downloaded container image to a first repository associated with the cloud-computing system registry, the first repository having a first repository tag of the second tags and a first repository digest of the second digests, the first copy being pushed when there is a mismatch of either first repository tag with one of the first tags or the first repository digest with one of the first digests; and
pushing a second copy of the copies of the downloaded container image to a second repository associated with the cloud-computing system registry, the second repository having a second repository tag of the second tags and a second repository digest of the second digests, the second copy being pushed when there is a mismatch of either second repository tag with one of the first tags or the second repository digest with one of the first digests.

2. The method of claim 1, wherein the first portion is a numerical value and the second portion is an alpha-numeric value.

3. The method of claim 2, wherein the first tags that have passed the first filtering process and the second filtering process only have the numerical value.

4. The method of claim 1, wherein a first digest of the first digests is compared with a second digest of the second digests when a match occurs between a first tag of the first tags and a second tag of the second tags during the comparison.

5. The method of claim 4, wherein the first digest includes a hash and the second digest includes a hash that matches the first digest hash and the synchronization is performed based on the first digest hash matching the second digest hash.

6. The method of claim 1, wherein comparing the first container images with the second container images further comprises:
determining that the first container image list includes a container image not listed on the second container image list;
downloading an instance of the container image listed on the first container list and not listed on the second container image from the remote source; and
synchronizing the first container image list with the second container image list includes adding the container image listed on the first container image list and not listed on the second container image list to a repository associated with the cloud-computing system registry in response to determining that the container image listed on the first container image list is not listed on the second container image list.

7. A system for synchronizing a first container image list with a second container image list, the system comprising:
at least one processor; and
at least one memory including instructions that, when executed by the at least one processor, cause the at least one processor to perform operations comprising:
configuring a tag filter to compare different portions of a tag;
accessing the first container image list from a remote source where first container images listed in the first container image list include first tags each having a first portion and at least one of the first tags having a second portion, the first container image list including first digests associated with the first tags;
comparing first portions of the first tags with the tag filter during a first filtering process;
comparing second portions of the first tags with the tag filter during a second filtering process;
keeping the first container images having first tags that have passed only the first filtering process;
accessing the second container image list from a cloud-computing system registry where second container images listed in the second container image list include second tags, the second container image list including second digests associated with the second tags;
comparing the first container images with the second container images by:
comparing first tags that have passed only the first filtering process with the second tags associated with the second container images; and
determining that the first tags have passed only the first filtering process; and
synchronizing the first container image list with the second container image list based on the comparison of the first container images with the second container images, the synchronizing comprising:
downloading a container image listed on the first container image list from the remote source;
creating copies of the downloaded container image listed on the first container image list;
pushing a first copy of the copies of the downloaded container image to a first repository associated with the cloud-computing system registry, the first repository having a first repository tag of the second tags and a first repository digest of the second digests, the first copy being pushed when there is a mismatch of either first repository tag with one of the first tags or the first repository digest with one of the first digests; and
pushing a second copy of the copies of the downloaded container image to a second repository associated with the cloud-computing system registry, the second repository having a second repository tag of the second tags and a second repository digest of the second digests, the second copy being pushed when there is a mismatch of either second repository tag with one of the first tags or the second repository digest with one of the first digests.

8. The system of claim 7, wherein the first portion is a numerical value and the second portion is an alpha-numeric value and the first tags that have passed the first filtering process and the second filtering process only have the numerical value.

9. The system of claim 7, wherein a first digest of the first digests is compared with a second digest of the second digests when a match occurs between a first tag the first tags and a second tag of the second tags during the comparison and the first digest includes a hash and the second digest includes a hash that matches the first digest hash and the synchronization is performed based on the first digest hash matching the second digest hash.

10. The system of claim 7, wherein comparing the first container images with the second container images further comprises:
determining that the first container image list includes a container image not listed on the second container image list;
downloading an instance of the container image listed on the first container image list and not listed on the second container image from the remote source; and
synchronizing the first container image list with the second container image list includes adding the container image listed on the first container list and not listed on the second container image list to a repository associated with the cloud-computing system registry in response to determining that the container image listed on the first container image list is not listed on the second container image list.

11. A non-transitory machine-readable medium having instructions embodied thereon for synchronizing a first container image list with a second container image list, the instructions executable by a processor of a machine to perform operations comprising:
configuring a tag filter to compare different portions of a tag;
accessing the first container image list from a remote source where first container images listed in the first container image list include first tags each having a first portion and at least one of the first tags having a second portion, the first container image list including first digests associated with the first tags;
comparing first portions of the first tags with the tag filter during a first filtering process;
comparing second portions of the first tags with the tag filter during a second filtering process;
keeping the first container images having first tags that have passed only the first filtering process;
accessing the second container image list from a cloud-computing system registry where second container images listed in the second container image list include second tags, the second container image list including second digests associated with the second tags;
comparing the first container images with the second container images by:
comparing first tags that have passed only the first filtering process with the second tags associated with the second container images;
determining that the first tags have passed only the first filtering process; and
synchronizing the first container image list with the second container image list based on the comparison of the first container images with the second container images, the synchronizing comprising:
downloading a container image listed on the first container image list from the remote source;
creating copies of the downloaded container image listed on the first container image list;
pushing a first copy of the copies of the downloaded container image to a first repository associated with the cloud-computing system registry, the first repository having a first repository tag of the second tags and a first repository digest of the second digests, the first copy being pushed when there is a mismatch of either first repository tag with one of the first tags or the first repository digest with one of the first digests; and
pushing a second copy of the copies of the downloaded container image to a second repository associated with the cloud-computing system registry, the second repository having a second repository tag of the second tags and a second repository digest of the second digests, the second copy being pushed when there is a mismatch of either second repository tag with one of the first tags or the second repository digest with one of the first digests.

12. The non-transitory machine-readable medium of claim 11, wherein the first portion is a numerical value and the second portion is an alpha-numeric value and the first tags that have passed the first filtering process and the second filtering process only have the numerical value.

13. The non-transitory machine-readable medium of claim 11, wherein a first digest of the first digests is compared with a second digest of the second digests when a match occurs between a first tag of the first tags and a second tag of the second tags during the comparison and the first digest includes a hash and the second digest includes a hash that matches the first digest hash and the synchronization is performed based on the first digest hash matching the second digest hash.

14. The non-transitory machine-readable medium of claim 11, wherein comparing the first container images with the second container images further comprises:
determining that the first container image list includes a container image not listed on the second container image list;
downloading an instance of the container image listed on the first container list and not listed on the second container image from the remote source; and
synchronizing the first container image list with the second container image list includes adding the container image listed on the first container image list and not listed on the second container image list to a repository associated with the cloud-computing system registry in response to determining that the container image listed on the first container image list is not listed on the second container image list.

* * * * *